April 7, 1953  H. N. BOGART ET AL  2,633,633
BRAZING OF AUSTENITIC FERROUS METALS
Filed Dec. 28, 1946

HAROLD N. BOGART
DONALD C. HART
INVENTORS

Patented Apr. 7, 1953

2,633,633

UNITED STATES PATENT OFFICE 2,633,633

BRAZING OF AUSTENITIC FERROUS METALS

Harold N. Bogart and Donald C. Hart, Detroit, Mich., assignors to Ford Motor Company, Dearborn, Mich., a corporation of Delaware Application December 28, 1946, Serial No. 719,002

8 Claims. (Cl. 29—359)

This invention is concerned with a welding process and more particularly with a system whereby austenitic steels and irons can be brazed, using as a brazing material copper or a copper base alloy. While many welding procedures are known which are applicable to austenitic irons and steels, the processes used are rather involved and require a far higher degree of skill than is required for ordinary welding. The art has long desired a simple process for brazing austenitic ferrous alloys, so that these alloys could be joined rapidly, cheaply and oftentimes in automatic conveyor furnaces. However, to date no such process has been known that is commercially acceptable.

While by no means so limited, a particularly happy application of the brazing process described in the specification occurs in the manufacture of tappet valves for internal-combustion engines. Internal-combustion engine valves have long been a source of trouble, particularly in engines operated for protracted periods of time under heavy load as in bus engines, truck engines and stationary power plants. Under these circumstances, exhaust valves are especially prone to failure. These valves are required to operate with their heads at a full red heat and at the same time are subject to chemical erosion from the hot products of combustion and especially by the various oxides of lead produced by the decomposition of the tetraethyl of lead employed to reduce detonation. In addition to being called upon to sustain this erosive chemical attack, the valve head must withstand as many as two thousand blows per minute, as the valve head is forced against the valve seat upon closing.

In an effort to incorporate greater durability into internal-combustion engine valves, it has become the practice to employ highly alloyed and expensive steels in their fabrication. A typical analysis of a forged valve composition is—

| | Per cent |
|---|---|
| Carbon | 0.30–0.45 |
| Manganese | 0.80–1.30 |
| Chromium | 18.00–20.00 |
| Nickel | 7.50–8.50 |
| Silicon | 2.75–3.25 |
| Phosphorus | .030 max. |
| Sulphur | .030 max. |
| Iron | Remainder |

A typical analysis of a cast valve is—

| | Per cent |
|---|---|
| Carbon | .95–1.20 |
| Chromium | 15.00–16.00 |
| Nickel | 13.00–15.00 |
| Silicon | 2.00–3.50 |
| Manganese | 0.20–0.30 |
| Sulphur | Commercial limits |
| Phosphorus | |
| Iron | Balance |

It is to be noted that both of these analyses present an austenitic, medium or high carbon, high silicon stainless steel of the widely known 18–8 type. To resist the mechanical shocks to which these valves are subject, it is customary to apply a ring of a hard facing material to the valve head. This hard facing ring is located so that it makes the contact between the valve head and the valve seat. A favorite material for hard facing valve heads is Stellite No. 6, which contains about 65% cobalt, 30% chromium and 5% tungsten. This hard facing material has been laid down as a welding deposit, preferably using an oxyacetylene flame, although some success has been attained with the electric arc. The Stellite is simply fused from a Stellite rod and deposited on the underside of the valve head. This has been almost entirely a manual operation and has proven to be both costly and time-consuming. Applicants propose to circumvent these difficulties and expenses by casting a suitably shaped ring of Stellite and brazing it to a valve head.

Accordingly, it is an object of this invention to provide a system whereby austenitic iron or steel can be brazed using copper or copper base brazing materials simply and economically.

It is a further object of this invention to provide a method for the manufacture of exhaust valves which is much more economical and reliable than methods currently in use.

It is a further object of this invention to provide an internal-combustion tappet valve which will be more durable under the extreme conditions encountered by exhaust valves under heavy load.

With these and other objects in view, our invention consists in the improved valve construction and method of manufacture as described in the specification, claimed in the claims and illustrated in the drawings, in which:

Figure 1:
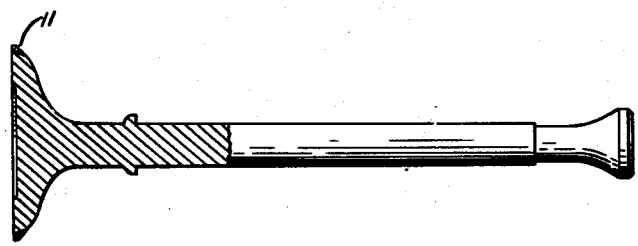
Figure 1 is an axial cross section of a finished valve.
Figure 2:
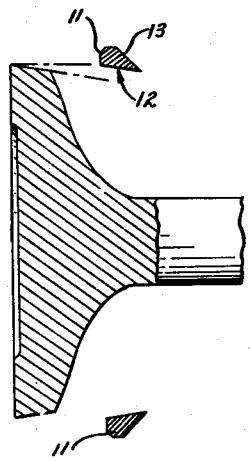
Figure 2 is an exploded view of the valve parts prior to brazing.

In Figure 2 of the drawing, the Stellite ring is indicated at 11. While these rings may be produced in any convenient manner, it is preferred to cast them using the "lost wax" or similar accurate founding process. When so produced, they approximate in the "as cast" condition very closely the desired final dimensions. The inner periphery 12 of the Stellite ring is ground to a locking taper which usually makes an angle less than seven degrees with the axis of the ring. The preferred angle for this inner periphery is four degrees. The outer periphery 13 of the valve is ground to accommodate the valve seat. This is conventionally at an angle of 45 degrees.

The valve proper is machined to give a press fit against the Stellite ring and is then copper plated to a depth of one or two thousandths of an inch. A ring of copper wire is placed above the joint between the valve and valve ring to provide an excess of copper for the subsequent brazing operation. To avoid the deleterious effects of chromium oxides, a small amount of anhydrous borax is used as a flux. The entire assemblage is then heated in a neutral or reducing atmosphere to melt the copper and effect the braze. The usual procedure at this point would be to heat the valve just comfortably above the melting point of copper (1981° F) in an atmosphere of hydrogen or cracked hydrocarbons and then to cool immediately in a similar protective atmosphere. However, applicants have discovered that superior results are obtained if the heating is conducted at a much higher temperature range and continued for 30 minutes. It is preferred to heat the valve to a temperature in the range 2050° F. to 2300° F. The use of this higher temperature for a substantial length of time causes the copper to penetrate the austenitic metal of the valve along the grain boundaries and to eventually disappear into the austenitic mass. The disappearance of the copper permits a metal-to-metal contact of the Stellite and austenitic valve metal and results in a very firm joint. A microscopic examination of the joint fails to disclose the presence of any of the brazing metal.

Valves fabricated according to this procedure have been thoroughly tested metallurgically and in actual service and have shown no sign of failure. A test engine ran 50,000 miles under heavy load and upon disassembly the valves were found to be in perfect condition as to the bond between the Stellite and the valve.

If desired, a lower melting brazing material such as Tobin bronze can be substituted for the copper as the brazing material. Since Tobin bronze has a lower melting point than copper, heating at 1850° for thirty minutes will suffice to insure complete dispersion of the brazing material in the austenitic material of the valve.

The above-recited procedure has been confined to the production of internal-combustion engine valves. However, this process is equally applicable to any situation requiring the brazing of austenitic irons or steels. These materials can be joined to like metals or to any other metal capable of being brazed.

The basic requirement of the process is that the copper base brazing material be initially melted to establish a bond and thereafter held at an elevated temperature for a sufficiently long time to accomplish complete absorption of the brazing metal into the austenitic mass. This holding treatment need not be at a temperature above the melting point of the brazing material, but on the contrary may be considerably below that point. Of course, in common with most metallurgical phenomena, the rate of reaction is accelerated with rising temperature and too low a holding temperature would involve an impracticably long holding time. It is understood, of course, that oxygen in all forms is to be rigidly excluded from the welding furnace due to its tendency to produce refractory oxides of chromium which inhibit the welding process.

As a matter of convenience and to prevent surface oxidation of the parts being brazed, it has been stated that the heat-treatment in which the brazing metal is absorbed into the austenitic mass be carried out in a neutral or reducing atmosphere. However, the necessity for a neutral or reducing atmosphere terminates as soon as the brazing material has been throughly melted. Thereafter, the heat-treatment may be executed in a standard furnace atmosphere or air.

We claim as our invention:

1. The process of brazing austenitic ferrous alloys with a copper base brazing metal comprising securing together the parts to be joined, placing at or near the joint a supply of copper base brazing metal, heating the assembly in a dry, neutral or reducing atmosphere to 1850 to 2300 degrees F. and holding in a similar protective atmosphere at such an elevated temperature until substantially all of the brazing metal has been absorbed into the austenitic metal.

2. The process of producing an austenitic hard faced tappet valve comprising copper plating the head of an austenitic poppet valve, securing on the head of said valve a ring of hard facing material, adding a copper base brazing material, heating the assembly in a dry, neutral or reducing atmosphere to 1850 to 2300 degrees F. and holding in a similar protective atmosphere at such an elevated temperature until substantially all of the brazing metal has been absorbed into the austenitic metal.

3. The process of producing an austenitic hard face tappet valve comprising copper plating the head of an austenitic poppet valve, securing on the head of said valve a ring of hard facing material, heating the assembly in a dry, neutral or reducing atmosphere to 1850 to 2300 degrees F. and holding in a similar protective atmosphere at such an elevated temperature until substantially all of the brazing metal has been absorbed into the austenitic metal.

4. The process of brazing austenitic ferrous alloys with a copper base brazing metal comprising securing together the parts to be joined, placing at or near the joint a supply of copper base brazing metal, heating the assembly in a dry, neutral or reducing atmosphere to 1850 to 2300 degrees F. and holding it at such an elevated temperature until substantially all of the brazing metal has been absorbed into the austenitic metal.

5. The process of producing an austenitic hard faced tappet valve comprising copper plating the head of an austenitic poppet valve, securing on the head of said valve a ring of hard facing material, adding a copper base brazing material, heating the assembly in a dry, neutral or reducing atmosphere to 1850 to 2300 degrees F. and holding it at such an elevated temperature until substantially all of the brazing metal has been absorbed into the austenitic metal.

6. The process of producing an austenitic hard faced tappet valve comprising copper plating the head of an austenitic poppet valve, securing on the head of said valve a ring of hard facing material, heating the assembly in a dry, neutral or reducing atmosphere to 1850 to 2300 degrees F. and holding it at such an elevated temperature until substantially all of the brazing metal has been absorbed into the austenitic metal.

7. The process of brazing austenitic ferrous alloys with a copper base brazing metal comprising securing together the parts to be joined, placing at or near the joint a supply of copper base brazing material, heating the assembly in a dry, neutral or reducing atmosphere to 1850 to 2300° F. for a period of time of at least thirty minutes and until substantially all of the brazing metal has been absorbed into the austenitic metal.

8. The process of producing an austenitic hard faced article comprising copper plating the article, securing on said article a hard facing member, adding a copper base brazing metal, heating the assembly in a dry, neutral or reducing atmosphere to 1850 to 2300° F. for a period of at least about thirty minutes and until substantially all of the brazing metal has been absorbed into the austenitic metal.

HAROLD N. BOGART.
DONALD C. HART.

REFERENCES CITED

The following references are of record in the file of this patent:

UNITED STATES PATENTS

| Number | Name | Date |
|---|---|---|
| 1,294,416 | Dady | Feb. 18, 1918 |
| 2,093,810 | Karmazin | Sept. 21, 1937 |
| 2,126,074 | Wissler | Aug. 9, 1938 |
| 2,210,314 | Wright | Aug. 6, 1940 |
| 2,358,090 | Longoria | Sept. 12, 1944 |

OTHER REFERENCES

The Welding Encyclopedia, Eleventh Edition, pp. 628 and 633. Published by the Welding Engineer Publishing Company, 506 S. Wabash Avenue, Chicago, Illinois.

General Electric Review, August 1936, pp. 381 and 385.

"Steel" Magazine, March 19, 1945, pages 114–116, 156.

"Product Engineering" Magazine, Oct. 1946, pages 103–107.